United States Patent [19]
Kaneda et al.

[11] Patent Number: 5,796,531
[45] Date of Patent: Aug. 18, 1998

[54] LIGHT BEAM DEFLECTION UNIT

[75] Inventors: Naoya Kaneda, Chigasaki; Harunobu Ichinose, Yokohama, both of Japan

[73] Assignee: Canon Kabushiki Kaisha, Tokyo, Japan

[21] Appl. No.: 669,131

[22] Filed: Jun. 24, 1996

Related U.S. Application Data

[63] Continuation of Ser. No. 277,634, Jul. 20, 1994, abandoned.

[30] Foreign Application Priority Data

Jul. 22, 1993 [JP] Japan .................... 5-201244

[51] Int. Cl.$^6$ .................... G02B 5/06; G02B 27/64
[52] U.S. Cl. .................... 359/832; 359/557
[58] Field of Search .................... 359/831, 832, 359/837, 554, 557, 670, 894, 431, 737, 819

[56] References Cited

U.S. PATENT DOCUMENTS

| | | | |
|---|---|---|---|
| 757,900 | 4/1904 | Englund | 359/832 |
| 1,811,946 | 6/1931 | Bailly | 359/832 |
| 2,504,039 | 4/1950 | O'Leary | 359/832 |
| 3,337,287 | 8/1967 | Lessman | 359/832 |
| 3,514,192 | 5/1970 | De La Cierva | 359/832 |
| 4,614,405 | 9/1986 | Brandenberg et al. | 359/832 |
| 5,138,494 | 8/1992 | Kurtin | 359/832 |
| 5,166,831 | 11/1992 | Hart | 359/832 |
| 5,173,807 | 12/1992 | Kaneda et al. | 359/698 |
| 5,311,367 | 5/1994 | Ohki et al. | 359/832 |

FOREIGN PATENT DOCUMENTS

| | | | |
|---|---|---|---|
| 0124519 | 5/1990 | Japan | 359/554 |
| 5134286 | 5/1993 | Japan | 359/832 |

*Primary Examiner*—Ricky D. Shafer
*Attorney, Agent, or Firm*—Fitzpatrick, Cella, Harper & Scinto

[57] ABSTRACT

In a light beam deflection unit such as a variable apical-angle prism, a holding member for holding a movable optical member, e.g., glass plates, is made of a high-stiffness material (for example, polycarbonate), and the holding member is connected with a displacing member, e.g., film sheets in the form of bellows, by a connecting portion incorporated with the holding member and welded to the displacing member. This arrangement can hold the movable optical member with high accuracy and can surely connect the holding member with the displacing member.

18 Claims, 7 Drawing Sheets

FIG. 4A PRIOR ART
FIG. 4B PRIOR ART
FIG. 4C PRIOR ART
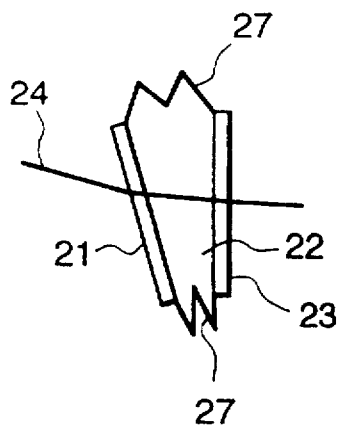
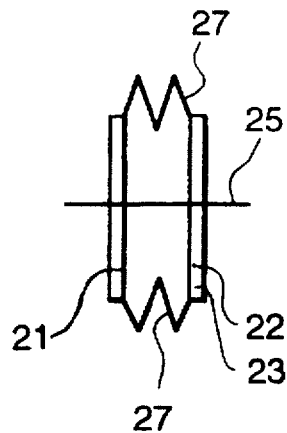
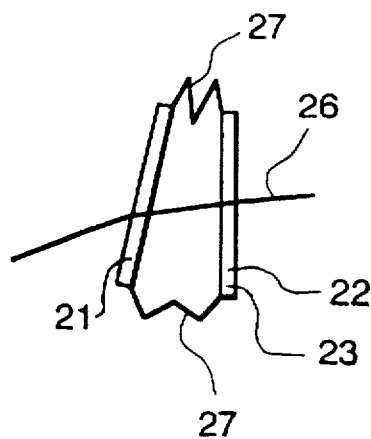
FIG. 5A PRIOR ART
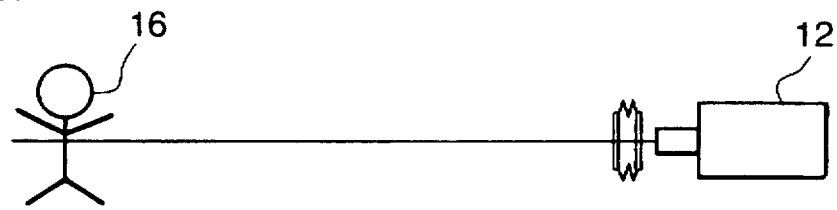
FIG. 5B PRIOR ART
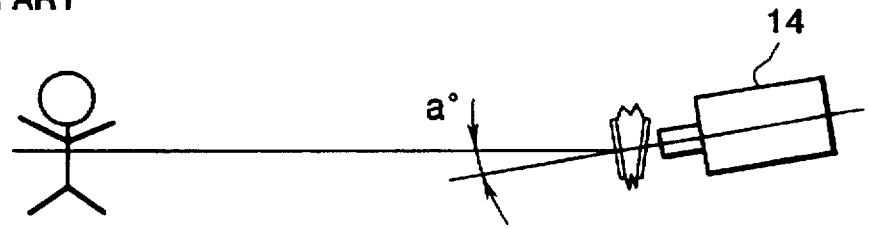

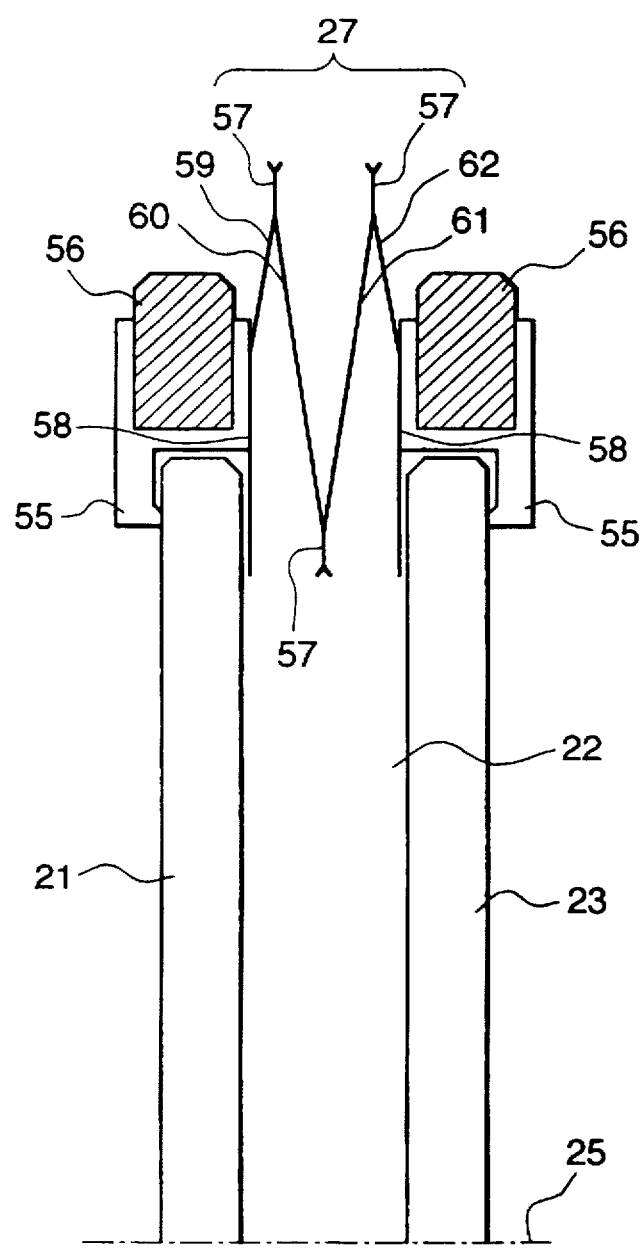

LIGHT BEAM DEFLECTION UNIT

This application is a continuation of application Ser. No. 08/277,634 filed Jul. 20, 1994, now abandoned.

BACKGROUND OF THE INVENTION

1. Field of the Invention

The present invention relates to the structure of a light beam deflection unit, for example, used for image blur prevention of optical instruments.

2. Related Background Art

Size and weight reduction is remarkable these days in the field of cameras such as video cameras and still cameras. At the same time, high performance is also intended to be achieved. An example of the high performance is an increase of the magnification of a photo-taking lens. For example, zoom lenses with magnifications of up to 10 to 12 are becoming popular in the field of cameras intended for home use.

With expansion of the zooming function the focal length tends to increase on the longer focus side, which causes hand vibration to affect images recorded. The hand vibration would result in badly moving a main subject in the screen in the case of a moving picture taken by a video camera, while recording a blurred image in the case of a still picture. In the case of the still picture, the problem can be avoided to some extent, for example, by increasing the shutter speed. In contrast, because the moving picture is recorded along the time axis in case of the moving picture, the effect of hand vibration cannot be avoided simply by adjusting the shutter speed. Under such circumstances, vibration preventing apparatus have been developed to suppress the effect of hand vibration, mainly, in the field of video cameras.

The vibration preventing apparatus includes at least vibration detecting means for detecting vibration components and vibration correcting means for correcting the vibration in accordance with detection results of the detecting means. The vibration detecting means may include a so-called electronic detection method to compare images between two sequential frames, or a method for directly measuring an actual motion of the camera using an angular velocity meter or an angular accelerometer.

Further, the vibration correcting means may include a so-called electronic correcting method to electronically select a region to be actually recorded (sampling region) from an obtained image, or optical vibration-correcting means for optically adjusting the angle of the shooting axis so as to suppress the hand vibration.

Among the optical vibration-correcting means, a method using a variable prism (variable apical angle prism) is specifically described in the following referring to FIGS. 4A to 4C thru FIG. 8.

FIGS. 4A to 4C show the structure of the variable prism. In FIGS. 4A, 4B, and 4C, reference numerals 21 and 23 each designate a glass plate, and 27 designates a bellows made of a material such as polyethylene, for example. A space surrounded by the glass plates 21, 23 and bellows 27 is filled with a transparent liquid, for example, with silicone oil.

FIG. 4B shows a state where the two glass plates 21 and 23 are parallel to each other, so that the angle of incidence of rays into the variable prism is equal to the angle of exit thereof. In contrast, in cases where the glass plates make an angle with each other as in FIG. 4A or FIG. 4C, rays are bent at an angle as shown by a ray 24 or 26, respectively.

Accordingly, supposing the camera is inclined because of the hand vibration, the vibration can be well suppressed by controlling the angle of the variable prism located in front of the lens system so as to bend rays in accordance with the angle.

FIGS. 5A and 5B show the control. In the state of FIG. 5A the variable prism is in the parallel state where a ray shown strikes a subject. In the state of FIG. 5B the variable prism is driven to match with a shake of an amount $a°$ to bend the ray as shown, whereby the shooting axis is still capturing the subject at the same position.

FIG. 6 is a drawing to show an example of actual construction of a variable prism unit including a variable prism, actuator portions for driving it, and apical-angle sensors for detecting the state of angle.

Since the actual vibration occurs in all directions, the front glass surface and the rear glass surface of the variable prism each are arranged as rotatable about respective rotation axes rotated 90° relative to each other. Components for the two rotation directions are discriminated from each other by putting attendant symbols a and b to reference numerals therefor. Components with a same number have a same function. Some components on the b side are omitted.

Numeral 41 designates a variable prism, mainly composed of glass plates 21, 23, bellows 27, and liquid. Each glass plate 21, 23 is incorporated through an adhesive with holding frame 28a and 28b. Each holding frame 28a and 28b forms rotational axis 33 with an unrepresented fixed component so that it can rotate about the axis. The axis 33a is shifted 90° relative to the axis 33b. A coil 35a (35b not shown) is provided on each holding frame 28a and 28b in a united manner. On the other hand, magnets 36a (magnet 36b not shown) and yokes 37a, 38a are set on the unrepresented fixed portion. Thus, supplying an electric current to the coils 35a and 35b, the variable prism 41 rotates about the axis 33. A slit 29a (29b not shown) is formed at the distal end of arm 30a (30b not shown) extending from the holding frames 28a and 28b (not shown) in a united manner, constituting an apical-angle sensor together with a light-emitting element 31a (31b not shown) such as iRED and a light-receiving element such as PSD both set on the stationary portion.

FIG. 7 is a block constitutional diagram to show a vibration preventing apparatus provided with the variable prism 41 as vibration correcting means in combination with a lens system. In FIG. 7, numeral 41 denotes the variable prism, 43 and 44 apical-angle sensors, 53 and 54 amplifying circuits for amplifying outputs from the apical-angle sensors 43, 44, respectively, 45 a microcomputer, 46 and 47 vibration detecting units, for example, including an angular accelerometer, 48 and 49 actuators each composed of the members of coil 35a or 35b to yoke 38a or 38b, and 52 a lens system.

The microcomputer 45 determines an electric current supplied to each actuator 48, 49 in order to control the variable prism 41 into a best angular condition to suppress the vibration in accordance with the angular states detected by the apical-angle sensors 43, 44 and the detection results of the vibration detecting units 46, 47. The reason why there are two blocks for each of the main elements is that the control was assumed to be independently executed in the two directions shifted 90° relative to each other.

FIG. 8 is a drawing to show further detailed structure of the conventional variable prism. In FIG. 8, numerals 21, 23 are the glass plates, 22 the liquid confined inside, 27 the bellows, and 25 the optical axis. Further, numerals 59 through 62 are films of four ring components forming the bellows 27, 57 connecting portions between the films, and 58 connecting portions between the films and the frames. A frame is composed of two components of mount 55 and mount core 56.

The connecting portions 57 between the films are connected with each other by welding. Because of this, a material for films 59-52 is preferably a material excellent in heat sealing properties at least on the two surface layers. For example, polyethylene (hereinafter referred to as PE) or polypropylene (hereinafter referred to as PP) is generally used. On the other hand, each mount 55 is bonded with an adhesive to the glass plate 21 or 23. If the connecting portions 58 between the frames and the films 59, 62 constituting the bellows are coupled by the welding as the connecting portions 57 are, the mounts must be made of the same material as that of the surface layer of the films. Comparing with the engineering plastics (for example, polycarbonate, hereinafter referred to as PC) frequently used for such components around the lens barrel, the materials as listed above, excellent in the heat seal properties, have such disadvantages that they are poor in component accuracy, low in stiffness, and easy to be deformed. Therefore, the mount cores 56 are provided to solve this problem. The mount cores 56 are made of a plastic with higher stiffness and higher heat deflection temperature than the material for mounts 55, or a metal such as aluminum or stainless steel. With the reference of mount core 56, mount 55 is formed around mount core 56, for example, by insert molding. This assures the flatness of portions of mounts 55, for example, to which the films are welded, the strength or dimensional accuracy of abutting portions to the glass plates 21, 23, and the dimensional accuracy of the fitting diameter of the glass plates.

In the variable prism of the conventional example shown in FIG. 8, however, the mount cores 56 were inevitably formed in a large size in order to attain the desired accuracy of mounts 55, which caused such a drawback that the variable prism had a large diameter.

Further, because the abutting portions and fitting portions are made of the material with excellent heat seal properties, such as PE or PP, the dimensional accuracy thereof, even using the mount cores, is inferior to that in case of the material such as PC used.

The present invention has been accomplished to solve such problems. It is an object of the present invention to provide a variable prism improved in the positional accuracy in the abutting directions of glass plates and reduced in the outer diameter.

SUMMARY OF THE INVENTION

One aspect of the invention is a light beam deflection unit which has an optical member, a holding member for holding the optical member, a displacing member for displacing the optical member, and a connecting member arranged to be incorporated with the holding member and welded to the displacing member. This arrangement improves the holding accuracy of the optical member by the holding member and assures surer connection between the displacing member and the connecting member.

BRIEF DESCRIPTION OF THE DRAWINGS

FIGS. 4A to 4C are drawings to show the principle of a variable prism;

FIGS. 5A and 5B are principle diagrams applying the variable prism to vibration prevention;

FIG. 8 is an elevation in cross section to show the structure of a conventional variable prism.

DETAILED DESCRIPTION OF THE PREFERRED EMBODIMENTS

Figure 1:
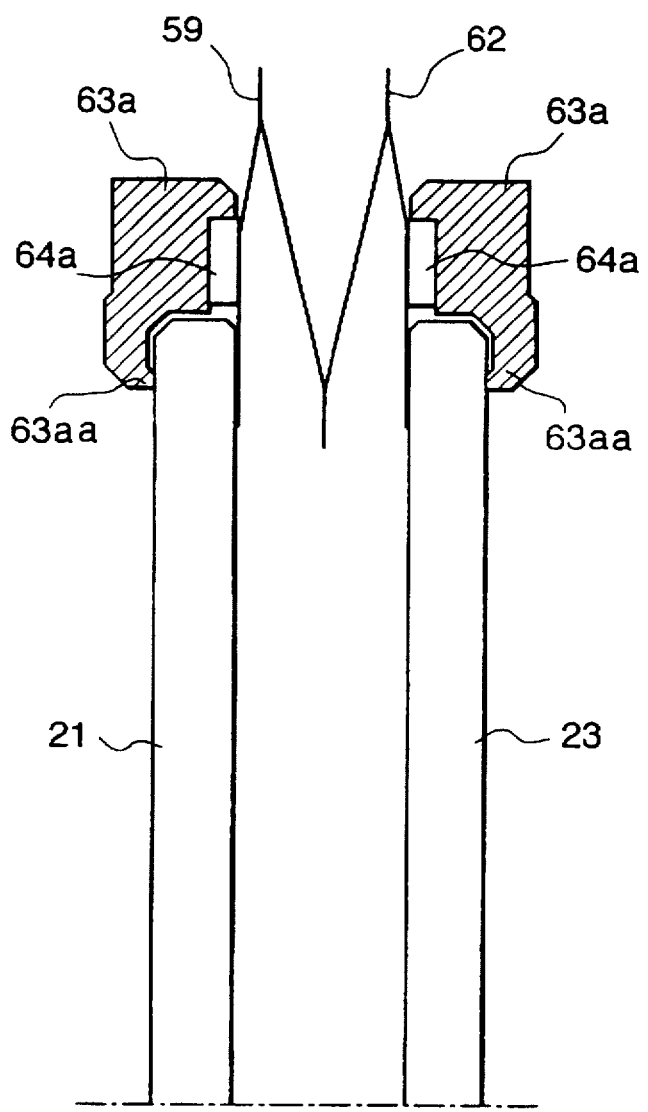
FIG. 1 is an elevation in cross section to show the first embodiment of the present invention.

FIG. 1 is an elevation in cross section of a variable prism to show the first embodiment. In FIG. 1, mounts 63a (as the holding member) each have portions abutting and fitting to a glass plate (as the optical member). In this embodiment, the members of mounts 63a are made of a material such as polycarbonate (PC).

On the other hand, mounts 64a (as the connecting member) welded to films 59, 62 (as the displacing member) are made of PE or PP as described above, which is the same as the material for the surface layer of the films. The mounts 63a are bonded to the associated mounts 64a with an adhesive.

Second Embodiment

Figure 2:
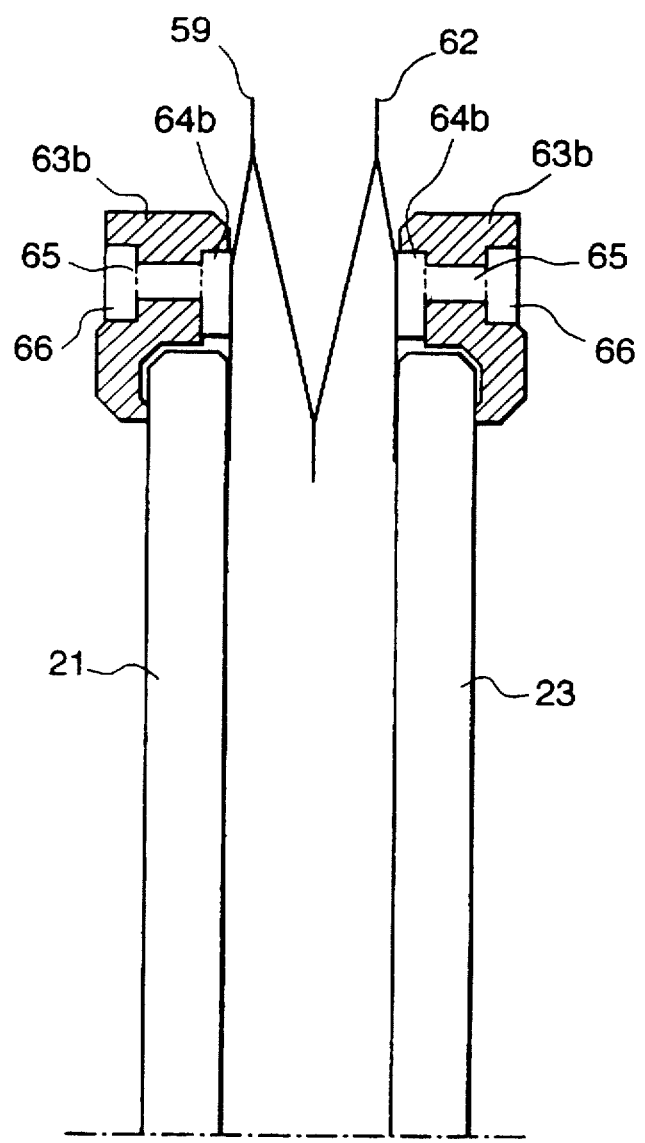
FIG. 2 is an elevation in cross section to show the second embodiment of the present invention.

FIG. 2 is an elevation in cross section of another variable prism to show the second embodiment of the present invention. In this example, mounts 64b and 63b are produced as follows. First, mounts 63b are produced by injection molding. Then the mount 63b is set in a die for molding the portion of mount 64b and thereafter the mount 64b is injection-molded of the material such as PE or PP, employing the insert molding method.

In this case, mount 64b is so formed that a disk portion is formed throughout the circumference and the material flows through several holes circumferentially formed through mount 63b to reach another disk portion 66 on the opposite side and forms a projecting portion 65 connecting the first disk portion (mount 64b) and the second disk portion 66. This arrangement does not require an adhesive to incorporate the mount 63b with the mount 64b.

Third Embodiment

Figure 3:
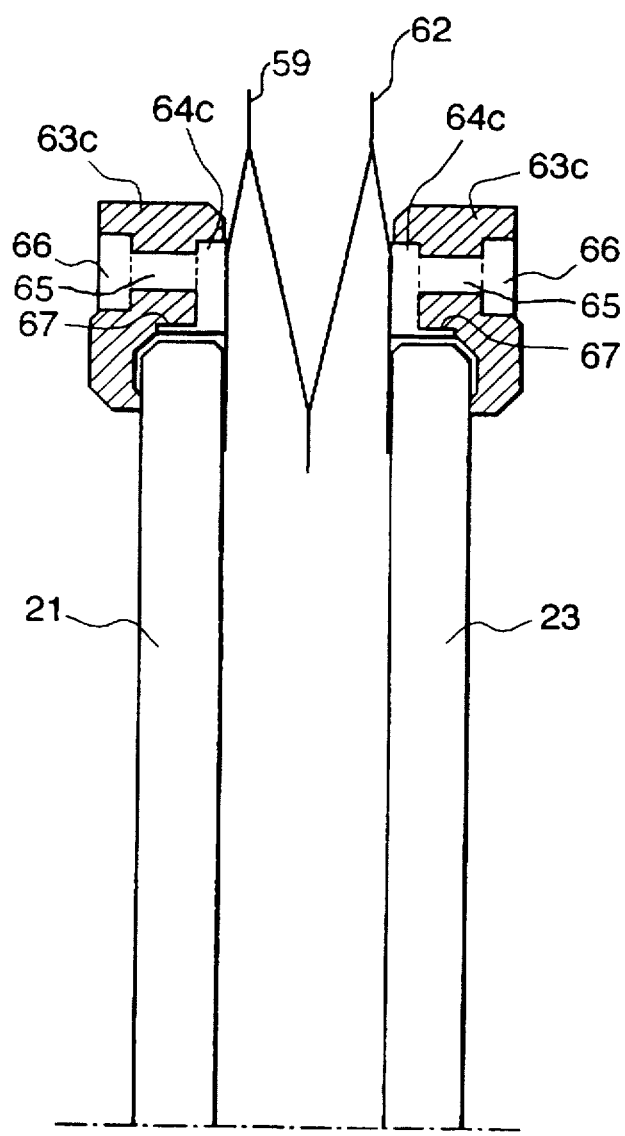
FIG. 3 is an elevation in cross section to show the third embodiment of the present invention.
Figure 6:
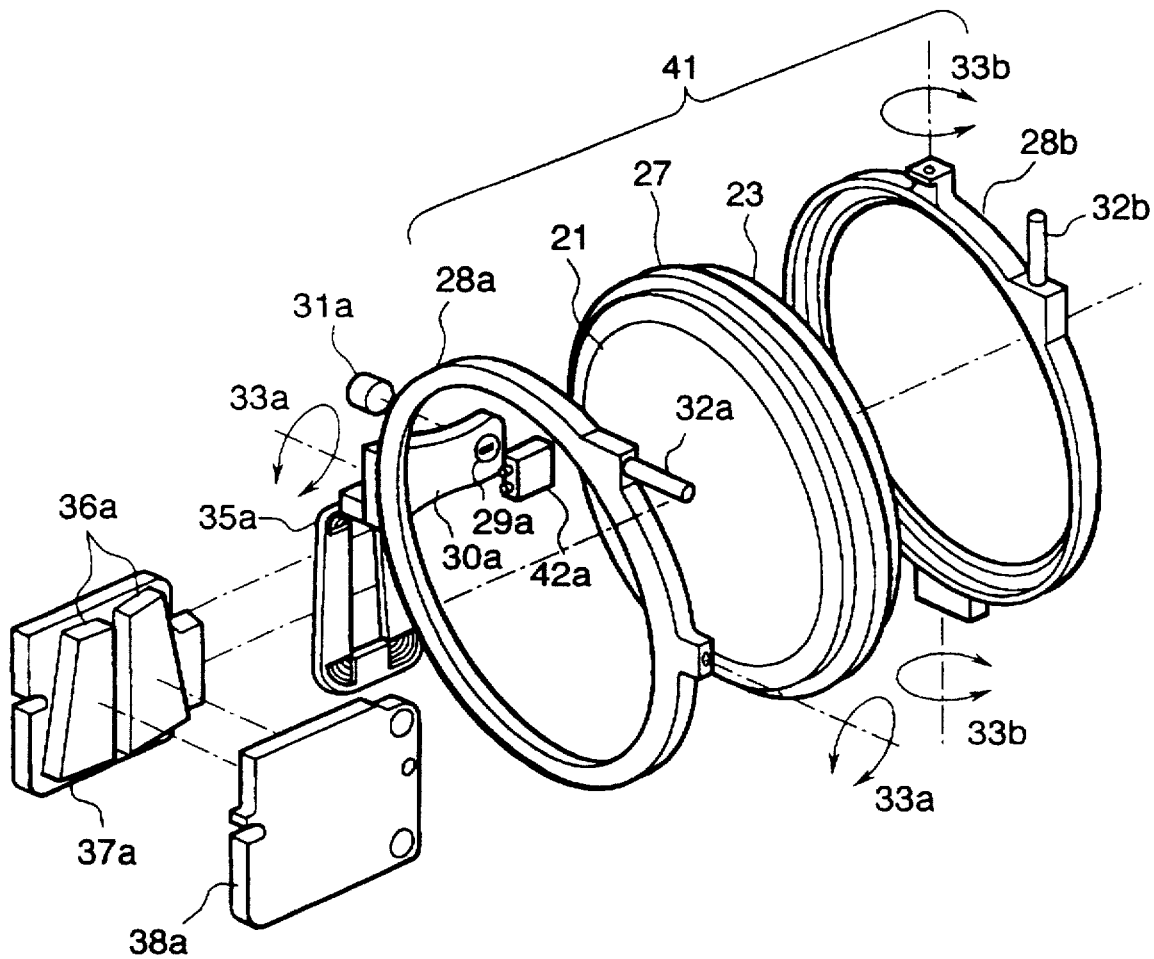
FIG. 6 is a perspective view to show an example of a drive unit for variable prism.
Figure 7:
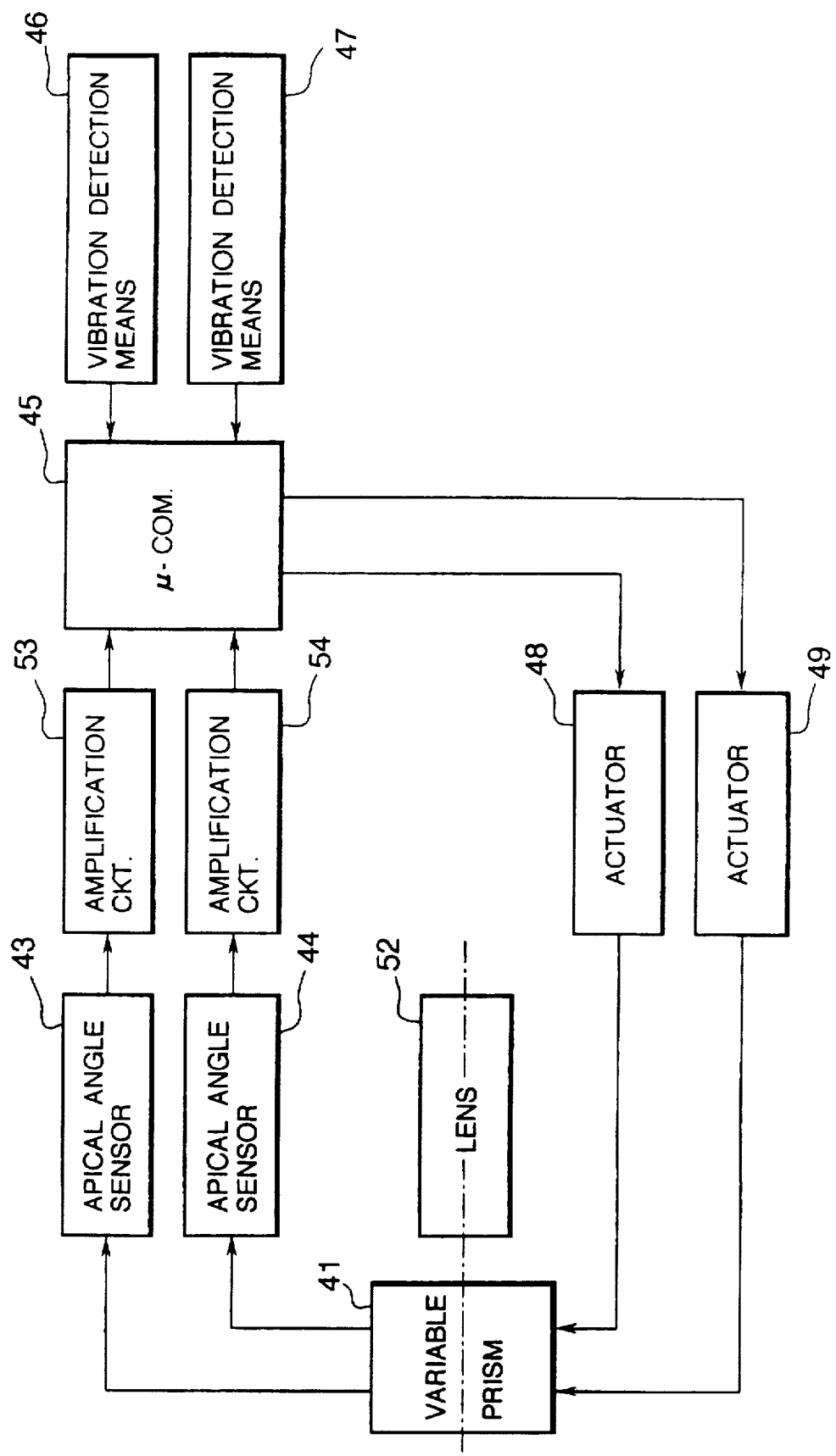
FIG. 7 is a block diagram of a vibration preventing apparatus using the variable prism.

FIG. 3 is an elevation in cross section of another variable prism to show the third embodiment of the present invention. In the third embodiment, extension 67 is integrally formed as extended from mount 64c so that the fitting portion (receiving portion in the radial direction) to glass plate 21, 23 is made of the same material as the material for mount 64c. The other arrangement and the disk portion 66 are the same as those in FIG. 2.

This arrangement expects the following effect. In bonding the glass plate 21, 23 to the associated mount, the plane strain or other strain is unlikely to be applied on the glass during drying the adhesive, because the receiving portion in the radial direction is made of the material with low stiffness such as PE or PP.

Although the second and third embodiments employed the insert molding method for producing the mounts, as described above, the method for incorporating the mounts may be any other method.

Further, high bonding strength can be maintained between the mounts 64a, 64b, 64c and the films 59, 62 in the respective embodiments, because they are bonded by welding to each other, similarly as in the conventional cases.

The first, second, and third embodiments as described above showed the variable prisms composed of the two glass plates as the optical member, the film members of bellows as the displacing member for displacing the optical member, and the transparent liquid, such as silicone oil, confined in the space formed by the glass plates and the films. It is, however, noted that the present invention is by no means limited to the variable prisms as described above. The same effect can be enjoyed as long as the variable prism is constructed of an optical member and a member for displacing it.

Although the above embodiments showed the examples where the plane glass plates were used as the optical member, the optical member is not limited to the examples. The optical member may be made of other material than glass as long as it has transparency. Also, the optical member may be formed in other shape than the plane plate.

Further, the above embodiments showed the examples where the member for displacing the optical member was the film members of bellows made of the material such as polyethylene, but the member is not limited to it. The member may be made of any other material and in any other shape as long as it can change the shape.

Also, the member for displacing the optical member, and the connecting member welded thereto may be made of any other material or materials as long as they can be welded to each other.

Further, the above embodiments showed the examples where the member for holding the optical member was made of polycarbonate, but it can be made of any other material as long as it has relatively high stiffness.

Also, the light beam deflection unit of the present invention can be used not only for the image blur prevention but also for deflection of light beam for other purposes.

According to the above embodiments, as detailed above, the variable prism is provided with the holding member for holding the optical member, and the member incorporated with the holding member and welded to the member for displacing the optical member, whereby the variable prism can be reduced in size in the radial direction and the positional accuracy of the optical member can be improved, without lowering the bonding strength of the welded portions.

What is claimed is:

1. A light beam deflection unit comprising:
   an optical member;
   a displacing member movable to displace said optical member; and
   a connection unit that connects said optical member and said displacing member, said connection unit comprising:
      a holding member contacting said optical member to hold said optical member, said holding member having a through hole from a contact side of the holding member to a noncontact side of the holding member remote from the displacing member; and
   a connecting member including a first connecting portion contacting said displacing member and fixed thereto, a second connecting portion located on the noncontact side of the holding member and engaging said holding member, and a projecting portion projecting through said through hole from the first connecting portion to the second connecting portion so as to engage said first connecting portion and said second connecting portion to prevent separation of said connecting member from said holding member, thereby to prevent separation of said displacing member from said optical member, said first connecting portion and said projecting portion being formed of substantially the same material.

2. The light beam deflection unit according to claim 1, wherein said holding member is made of a first material and said connecting member is made of a second material different from the first material.

3. A light beam deflection unit according to claim 2, wherein said first material has a higher stiffness than said second material.

4. A light beam deflection unit according to claim 2, wherein the second material is weldable to said displacing member.

5. A light beam deflection unit according to claim 2, wherein the second material has a higher heat seal capability than the first material.

6. A light beam deflection unit according to claim 1, wherein each of said first connecting portion and said second connecting portion include a portion whose width in the direction of radius of said through hole is larger than the diameter of said through hole.

7. A light beam deflection unit according to claim 1, wherein said first connecting portion is formed of the same material as said displacing member.

8. A light beam deflection unit according to claim 1, wherein said first connecting portion is fixed by seizing.

9. A light beam deflection unit according to claim 1, wherein said connecting member further comprises means for integrally holding said optical member at said first connecting portion.

10. A light beam deflection unit according to claim 1, wherein said displacing member comprises a deformable member.

11. A light beam deflection unit according to claim 1, wherein said displacing member comprises a sheet member in the form of bellows.

12. A light beam deflection unit according to claim 1, wherein said optical member comprises a transparent plate.

13. A light beam deflection unit according to claim 1, wherein said displacing member comprises means for inclining and moving said transparent plate.

14. A light beam deflection unit according to claim 1, further comprising a transparent liquid for filling a space formed at least in part by said optical member and said displacing member.

15. A light beam deflection unit according to claim 1, wherein the deflection unit is a variable prism.

16. A light beam deflection unit according to claim 1, wherein one of said first connecting portion and said second connecting portion of said connecting member is injection molded into the other one of said first connecting portion and said second connecting portion of said connecting member.

17. A light beam deflection unit according to claim 1, wherein the first connecting portion of said connecting member is premolded, and said second connecting portion is injection-molded into said first connecting portion.

18. An optical apparatus comprising:
   an optical member;
   a displacing member movable to displace said optical member; and
   a connection unit for connecting said optical member and said displacing member, said connection unit comprising:
      a holding member contacting said optical member to hold said optical member, said holding member having a through hole from a contact side of the holding member to a noncontact side of the holding member remote from the displacing member; and a connecting member including a first connecting portion contacting said displacing member and fixed thereto, a second connecting portion located on the noncontact side of the holding member and engaging said holding member, and a projecting portion projecting through said through hole from the first connecting portion to the second connecting portion so as to engage said first connecting portion and said second connecting portion to prevent separation of said connecting member from said holding member, thereby to prevent separation of said displacing member from said optical member, said first connecting portion and said projecting portion being formed of substantially the same material.

* * * * *